United States Patent

Gonzenbach et al.

[11] Patent Number: 5,988,049
[45] Date of Patent: Nov. 23, 1999

[54] FLUID REMOVAL BY MECHANIZED LONG VACUUM BLADE

[75] Inventors: Max A. Gonzenbach; Rudolph A. Nef; David K. Gonzenbach; Timothy P. Czmowski; Kenneth J. Hermans; Lance M. Johnson, all of Milbank; Shaun R. Hooth, Corona, all of S. Dak.

[73] Assignee: Valley Queen Cheese Factory, Inc.

[21] Appl. No.: 09/021,798

[22] Filed: Feb. 11, 1998

[51] Int. Cl.⁶ .............................. A01J 25/11; A01J 25/13; A23C 19/02; A23C 19/05
[52] U.S. Cl. ................................ 99/454; 99/458
[58] Field of Search .............................. 99/452, 453, 454, 99/456–459, 353–356, 495; 100/115–118, 125, 110; 249/113; 425/84, 85, 405 R; 426/414, 36, 413, 478, 491, 512, 582, 495; 210/513–515, 808

[56] References Cited

U.S. PATENT DOCUMENTS

| | | |
|---|---|---|
| 3,355,805 | 12/1967 | Krueger et al. ........................ 99/458 |
| 3,969,995 | 7/1976 | Krueger et al. . |
| 4,049,838 | 9/1977 | Krueger et al. . |
| 4,234,615 | 11/1980 | Krueger . |
| 4,263,330 | 4/1981 | Streeter et al. . |
| 4,289,793 | 9/1981 | Gustafson et al. ........................ 426/491 |
| 4,291,064 | 9/1981 | Retzlaff . |
| 4,334,465 | 6/1982 | Brockwell et al. ........................ 99/454 |
| 5,024,146 | 6/1991 | Dull . |
| 5,373,779 | 12/1994 | Grusin ........................ 99/458 |
| 5,752,434 | 5/1998 | Kuan ........................ 99/458 X |

Primary Examiner—Timothy F. Simone
Attorney, Agent, or Firm—Gerald E. Helget; Mackall, Crounse & Moore, PLC

[57] ABSTRACT

Fluid is efficiently and uniformly removed from successive bodies of a product by a combination of finely perforated wedge shaped hollow blades sufficiently long as to fully penetrate the product body depth, a series of vacuum suction tubes arranged within the blades for pressure differential removal of accumulated free fluid from the lowest point of the product body, a pneumatic or other cylinder to provide linear motion, position control, and cyclic variation in applied load for introduction and withdrawal of each blade and suction tube assembly to and from successive bodies of the product, and mechanism allowing the blade and suction tube assembly to travel only in a defined linear path for repeatable unimpeded entry to and withdrawal from successive product containers, each of which is mechanically fed into and precisely held in a series of locations directly beneath wedge and suction tube assemblies.

7 Claims, 5 Drawing Sheets

FLUID REMOVAL BY MECHANIZED LONG VACUUM BLADE

BACKGROUND AND FIELD OF THE INVENTION

The present invention provides an improved means for the controlled primary removal of fluid whey from a body or successive bodies of specifically fresh cheese curd material while the curd material is yet in the soft, particulate, warm, malleable slurry form, and thereby for attaining positive, consistent, and repeatable control of the remaining and subsequently developing whey fluid content, and particularly, control of the distribution of that remaining and subsequently developing whey fluid, by means of combining a number of mechanical innovations to permit the repeated mechanical unimpeded controlled entry and removal of one or more long deeply penetrating wedge shaped perforated hollow drain blade and vacuum suction tube assemblies to and from a succession of containers holding the curd material through the primary fluid removal process. Included are means to precisely control the orientation and path of reciprocating travel of the long perforated wedge shaped drain blade and vacuum suction tube assemblies, means to vary over a time/ location frame of reference, the force applied to the pressure plate / long perforated hollow wedge shaped drain blade and vacuum suction tube assemblies during successive entry and/or reentry to the material containers, means to motivate and accurately position a succession of material containers in precise three dimensional and orientational proximity to a number of pressure plate / long perforated wedge shaped drain blade and vacuum suction tube assemblies, means for remote visual human operator inspection to ensure that each individual vacuum suction tube assembly can be maintained in full operating condition, means to check weigh each container immediately following primary whey removal to detect both insufficient and excessive removal of whey, and means to provide and automatically control all necessary mechanical functions, entirely repeatable on a variable time frame basis to enable the described process and apparatus to optimally function for a variety of cheese curd varieties, and with only the periodic supervisory indirect involvement of human operators during the whey removal process.

A variety of methods for production of cheese and its primary shape molding by direct filling in slurry form into for example the giant "640" block, along with various methods and combinations of methods for extraction of fluid whey, have long been known in the art. A shortcoming of all known and all commercially used such processes to date has been the inability to achieve and consistently ensure, on a commercial production scale, the removal of a precise amount of whey from each particularly larger production body of cheese product, leaving within the body only the most desirable amount of whey. A further consistent shortcoming of known such systems and devices, is the inability to leave the remaining whey in a state where it is uniformly distributed throughout the body of cheese, particularly at the time of shredding or cutting into smaller consumer portions, at which time the whey content in various parts of the original body of cheese is generally tested and evaluated.

Low whey content, while sometimes acceptable in a given product classification, reduces the productivity of the cheesemaking process by transferring more fluid whey than is necessary to disposal or to other low value processes.

High whey content, through part or all of the curd body, while increasing the weight and volume of the final cheese product, becomes unacceptable from a product standards and marketability aspect, resulting generally in devaluation of this product, at least on a per container basis, and possibly on a per shipment or per supplier basis.

A further sometimes adverse condition of known and commonly used methods and mechanisms utilizing tubular vacuum probes, which are forced to penetrate the curd body for withdrawal of fluid whey, is that cavities are sometimes left within the cheese body which attract and tend to become filled with free whey which is thereby not necessarily fully reabsorbed, even over long storage periods, by the parent curd body, producing at times rancidity and a major devaluation of the product.

Said tubular vacuum probes are typically constructed as a tube within a tube, the inner vacuum tube serving to affect fluid extraction and the outer perforated tube serving as a wet well for the accumulation of free fluid in ideal proximity to the lower end of the inner tube, the process for large cheese blocks requiring relatively large numbers of tube assemblies penetrating each body of cheese curd to remove sufficient whey and to leave the remaining whey in a somewhat evenly distributed state. Such multiple tube assemblies are costly to provide in a hygienic state, and are inherently difficult to clean, needing frequent manual disassembly, causing both a frequent high labor usage requirement for sanitary operation, and a major potential for insanitary operation.

Known and commercially used traditional systems for the extraction of whey from large blocks of cheese, utilizing perforated hollow wedge shaped drain blades, have previously required the use of dual sets of blades, one beneath the cheese curd slurry as it enters the container, and another which enters the top of the body of cheese curd shortly after filling is completed, each set penetrating nominally only half of the total depth of the body of product.

Such use of perforated drain blades has not been combined with the use of vacuum tubes placed within the hollow drain blades.

The use of dual sets of blades requires, after a limited time, and after removal of the upper penetrating blade set, that each body of cheese curd in turn be inverted through 180 degrees so that the lower blade set can now be removed from the product body without undue loss of product from the container. The requirement for inversion necessitates further utilization of floor space, additional equipment, additional steps in the process, and is generally labor intensive and dangerous to human operators. Said systems tend to be inefficient in terms of floor space usage, product spillage, cleanup chemical and water usage, and physical human effort requirement, for both production and cleanup.

A further general inefficiency of primary whey removal systems, currently used in cheese manufacturing, is caused by human operator error, heightened by fatigue and repetition based boredom, resulting in a generally high incidence of inconsistencies in the repeatability of many process steps with consequential degradation in product quality and consistency, and in production equipment damage, down time, repair, and replacement.

SUMMARY OF THE INVENTION

The system provided herein for the draining and extraction of free fluids from bodies of material is directed particularly to the optimal improvement, while in the fresh malleable particulate state, of forming blocks of cheese, not limited to but including in typical form the giant cheese block which may be of 700 pounds weight or more, achieved by controlled removal of only the desired amount of available and forming fluid whey from the curd body in such a way as to maximally promote uniformity of the resulting residual fluid whey distribution throughout the curd body, and to cause no permanent lack of homogeneity in the curd body by way of the necessary mechanical penetration of whey removal devices. Controlled predetermination of the final amount of whey fluid in the body as a percentage of the individual curd body total weight, consistent achievement of uniform distribution of fluid throughout the body, and the homogeneous nature of each body of cheese curd following the necessary whey removal procedures, are all fundamental to the final quality, productivity, and salability of the product, and all promote suitability for further added value processes. While this is in a general sense true for all cheese product, it is of great importance in the case of bulk American type cheese production, and of particular economic importance in long hold aged cheese production, where typically giant blocks are held for extended periods of time at controlled low temperatures to permit progressive development of desirable texture and flavor, and the consistent and predetermined known establishment of the most desirable level of fluid whey retention, and the uniformity of fluid whey distribution within and throughout each body of cheese, along with a void free homogeneous structure throughout each body of cheese, are all fundamental to the success of this process. As the long term cold storage retention of cheese to achieve the characteristics deemed desirable for aged or sharp varieties adds considerably to the cost of production, it is of heightened importance in this process to consistently ensure optimal fluid percentage and uniformity of distribution, and homogeneous structure, to both further the development of desirable aging characteristics, and to protect the further investment in this product by eliminating as far as possible the necessity to cull less acceptable product for disposal at reduced value during the final market preparation and consumer packaging stage. Other advantages of the described invention, considered to be of prime importance in the current manufacturing plant environment, is the ability to with consistent repeatability cyclicly and precisely control all physical process elements by means of electronic programmable control systems allied with mechanical motion devices and electronic motion detection devices. This mechanization and precision repeatability effectively removes human labor from the process of physical product motivation and from the minute by minute initiation of each subsystem, thereby greatly enhancing the ease and surety of establishment of periodically changing procedural menus for different cheese varieties, precluding the necessity for considerable systematic often heavy human physical effort, and removing human operators physically from many of the common interactions with mechanical equipment which historically have produced a great many very costly human injuries.

An object of the applicants' invention is to provide a system for efficient removal of fluid from a body of product, particularly whey from a body of fresh cheese curd, and particularly whey from a large body of fresh cheese curd, and particularly whey from a deep body of fresh cheese curd, by insertion progressively into that body of product, in a downward direction, of one or more finely perforated screens typically fabricated from corrosion resistant metal mesh material, and shaped in the manner of a slim hollow wedge, typically of width to traverse most of the width of the product container, and particularly of sufficient depth as to permit full penetration of the body of curd and reach essentially all of the distance from the upper product surface to the lower product surface, in order to bring an evacuated wedge wet well into the closet practical proximity to all volumetric elements of the entire body of cheese curd, thereby enabling free fluid whey to percolate by a reasonably short path from any location, and particularly those locations at or near the lower extremities of the parent curd body, into a wet well void.

A further object of the applicants' invention is to provide a system whereby successive bodies of cheese curd are penetrated specifically to their full depth by one or more than one fluid whey extraction device which upon being removed after primary whey removal leaves a void in the body of cheese curd which by its shape permits the void to quickly close and heal under the action of both gravitational forces and subsequent external pressure being applied by a top pressure plate, becoming effectively homogeneous.

A further object of the applicants' invention is to provide a system whereby the vacuum tubes entering the product for the removal of fluid whey, are housed within the hollow center portion of a finely perforated wedge, thereby gaining access for removal of the accumulating fluid whey entering and collecting in the wedge wet well, obviating the need for each vacuum tube to be equipped with a matching outer perforated tube acting as a wet well for collection of percolating fluids.

A further object of the applicants' invention is to provide a system whereby the lower end of each vacuum tube is provided access to accumulating fluid at or close to the lowest extremity of the curd body, for removal of the maximum available amount of fluid whey within the limited amount of available time, by provision of deep finely perforated screens typically fabricated from corrosion resistant metal mesh material, and shaped in the manner of a slim hollow wedge, typically of width to traverse most of the width of the product container, and particularly of depth and penetration to reach essentially all of the distance from the upper product surface to the lower product surface.

A further object of the applicants' invention is to provide a system whereby the assembly or assemblies comprising primarily the finely perforated screens typically fabricated from corrosion resistant metal mesh material, and shaped in the manner of a slim hollow wedge, along with the attendant vacuum tubes for the differential pressure removal of fluid whey, is or are mounted rigidly to the prime moving element of a linear motion actuation device, typically the shaft of a pneumatic air cylinder, which provides linear motion in a controlled reciprocating manner, along with a supplementary system which provides for rotational fixation of the said wedge and vacuum tube assembly or assemblies as it or they execute said controlled reciprocating motion, as well as precise fixing of the actual linear path of said devices throughout the entire range of said controlled reciprocating linear motion.

A further object of the applicants' invention is to provide a system whereby the linear acting load force applied to any or each of the assemblies comprising primarily one or more than one finely perforated screen typically fabricated from corrosion resistant metal mesh material, and shaped in the manner of a slim hollow wedge, along with the attendant vacuum tube or more than one tube for the differential pressure removal of fluid whey, by action of the prime moving element of a linear motion actuation device, typically the shaft of a pneumatic air cylinder, is in a controlled and variable manner, periodically increased or decreased in any combination, providing a means for application primarily of a low load force during the major portion of the penetrating motion in order to limit the potential for physical or other damage should some physical interference occur, and the application primarily of a high load force for the time during which the penetrating assemblies are considered to have largely penetrated the cheese curd container.

A further object of the applicants' invention is to provide a perforated pressure plate of particular design detail around its upper peripheral edge, facilitating the minimization of wastage of cheese curd product normally extruded through and escaping from the peripheral gap between pressure plate and container.

A further object of the applicants' invention is to provide a system whereby any or each of the assemblies comprising primarily one or more than one finely perforated screen typically fabricated from corrosion resistant metal mesh material, and shaped in the manner of a slim hollow wedge, along with the attendant vacuum tube or more than one tube for the differential pressure removal of fluid whey, may optionally upon being considered to have largely penetrated a body of cheese curd in its container, be cyclicly partly or fully withdrawn from the cheese curd container, and reinserted, providing a pulsing effect to the load applied by the mounting plate of said penetrating assembly to the body of cheese curd, and also frequently changing the relationship between the perforated screen surface and the curd surface, for the purpose of inducing the more speedy expulsion of a greater volume of fluid whey than would be possible without said pulsing effect.

A further object of the applicants' invention is to provide a system whereby the assembly or assemblies comprising primarily a cheese curd container with attendant conveyance and other devices for control of the cheese, is or are brought sequentially into a precise orientational and positional relationship with one or a succession of the assemblies comprising primarily one or more than one finely perforated screen typically fabricated from corrosion resistant metal mesh material, and shaped in the manner of a slim hollow wedge, along with the attendant vacuum tube or more than one tube for the differential pressure removal of fluid whey, in order to permit, unattended by human operator, the repeated accurate and non impacting entry and full depth penetration, and also the non-impacting removal sequentially of each of the said one or more than one assemblies comprising primarily one or more than one finely perforated screen typically fabricated from corrosion resistant metal mesh material, and shaped in the manner of a slim hollow wedge, along with the attendant vacuum tube or more than one tube for the differential pressure removal of fluid whey.

A further object of the applicants' invention is to provide a device whereby a human supervisor can by observing from a location close to but remote from the moving elements of the described primary whey removal system, readily perceive within a short passage of time that each of the individual whey removal suction tubes is open to the pressure differential induced passage of air for the purpose of fluid whey removal.

A further object of the applicants' invention is to provide a device whereby each cheese curd container upon exiting the primary whey removal process passes over a finely calibrated weighing device which emits a signal upon detecting any container of gross weight falling outside a selectable and predetermined limited range, thereby directing a human supervisor to check for malfunction particularly in the small internal diameter fluid whey evacuation suction tubes.

A further object of the applicants' invention is to provide a coordinated system where all mechanical functions and control timing, sequential, detection and initiation functions of the entire primary whey removal system described, are provided by electro—mechanical pneumatic means, requiring only the periodic setup and supervision of a human operator, combining an electronic programmable controller based control system with the necessary detection elements, and pneumatic - mechanical orientation, positional, motivation and location devices.

These and other objects and advantages of the applicants' invention will more fully appear from examination of the accompanying drawings and description.

DESCRIPTION OF THE DRAWINGS

Also shown is a pair of vacuum tube assemblies, one pair located within the open center of each of the open wedges, and slide rails which control direction of pressure plate assembly motion through much of its travel.

DESCRIPTION OF A PREFERRED FORM OF THE INVENTION

Figure 1:
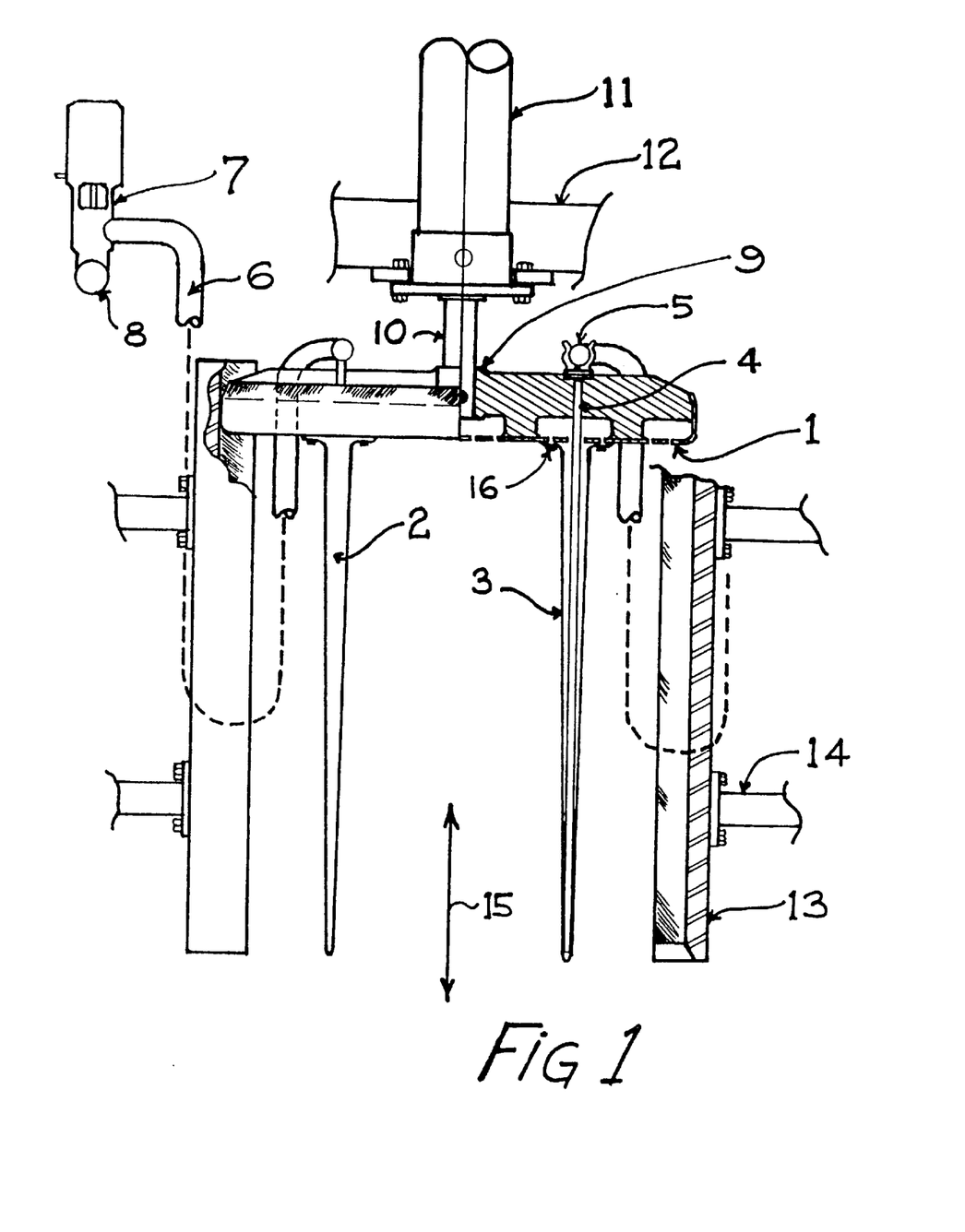
FIG. 1 is an elevational/section view of a slim wedge and vacuum tube assembly in its most typical form, showing the perforated base plate which upon substantial penetration applies downward pressure to the upper surface of the curd body restrained within its shape mold container, with a mechanical coupling enabling attachment of the assembly to a mechanism providing linear motion and the necessary force for penetration and pressing, and a pair of structural cantilevered extension frames of shape and detail to accept the shown finely perforated screens and sufficiently strong as to maintain the screens in the desired alignment substantially perpendicular to the direction of motion required for penetration.
Figure 2:
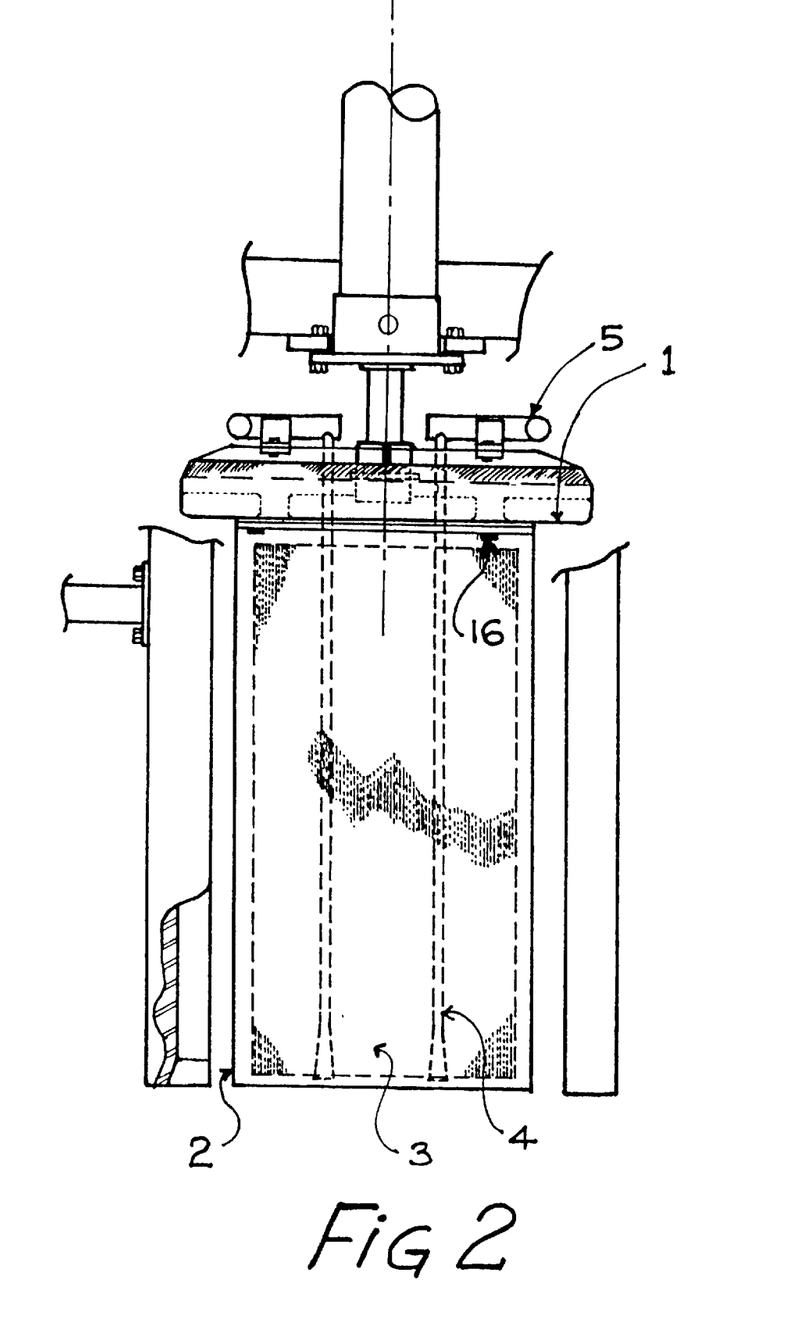
FIG. 2 is a further elevational/section view showing the same slim wedge and vacuum tube assembly from a direction rotated 90 degrees from FIG. 1.
Figure 3:
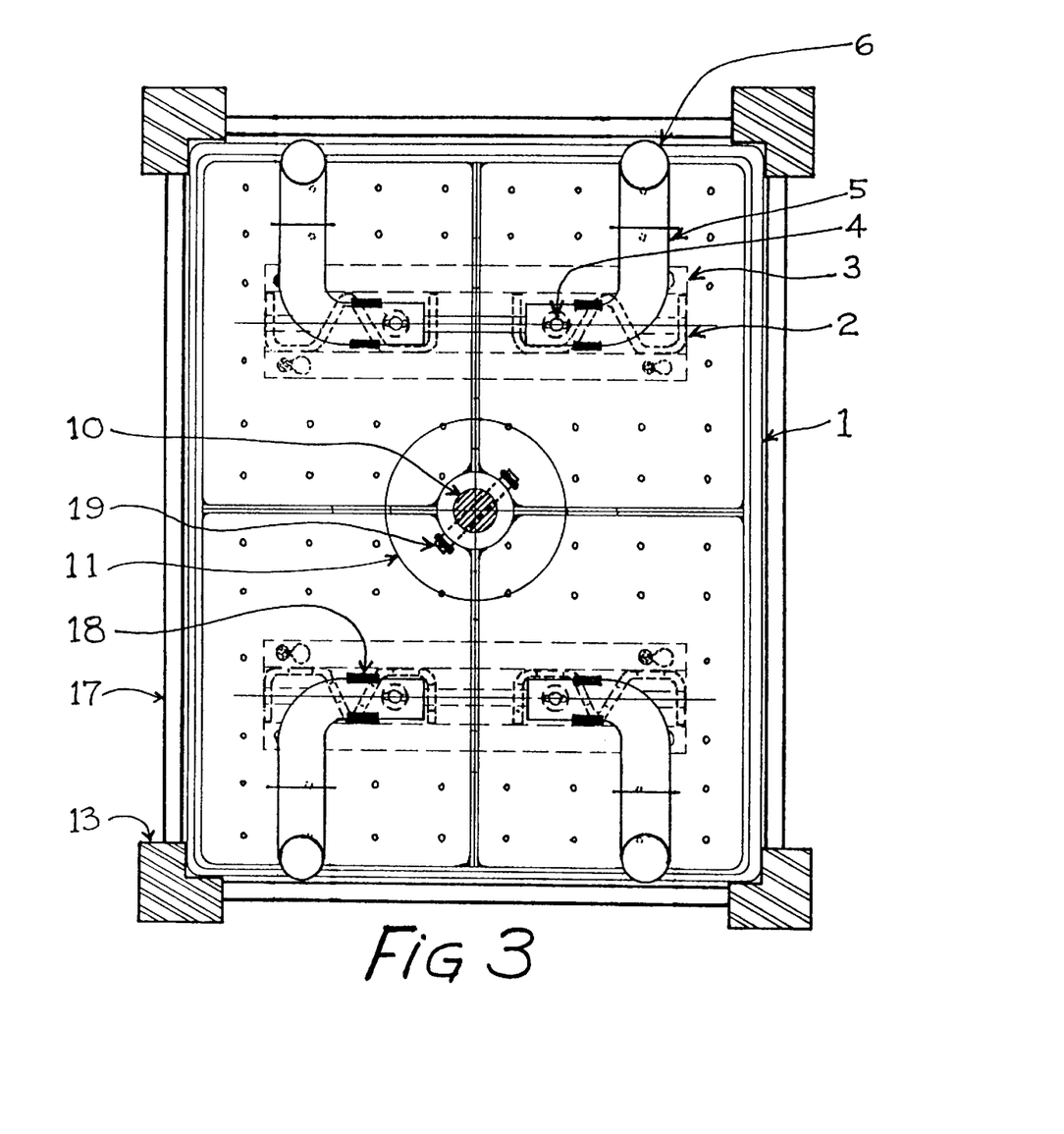
FIG. 3 is a plan view from above showing one perforated pressure plate, slim wedge, and vacuum tube assembly in alignment with a rectangular cheese curd container.

The primary whey removal elements of the inventors' system for improved whey removal, and thereby for improved residual whey distribution, in a large body of fresh cheese curd, using for the first time a specifically full depth penetrating perforated wedge combined with vacuum tubes which are disposed within the hollow wedge, is best shown by the elevation / section views in FIG. 1 and FIG. 2, and the plan view in FIG. 3.

Figure 4:
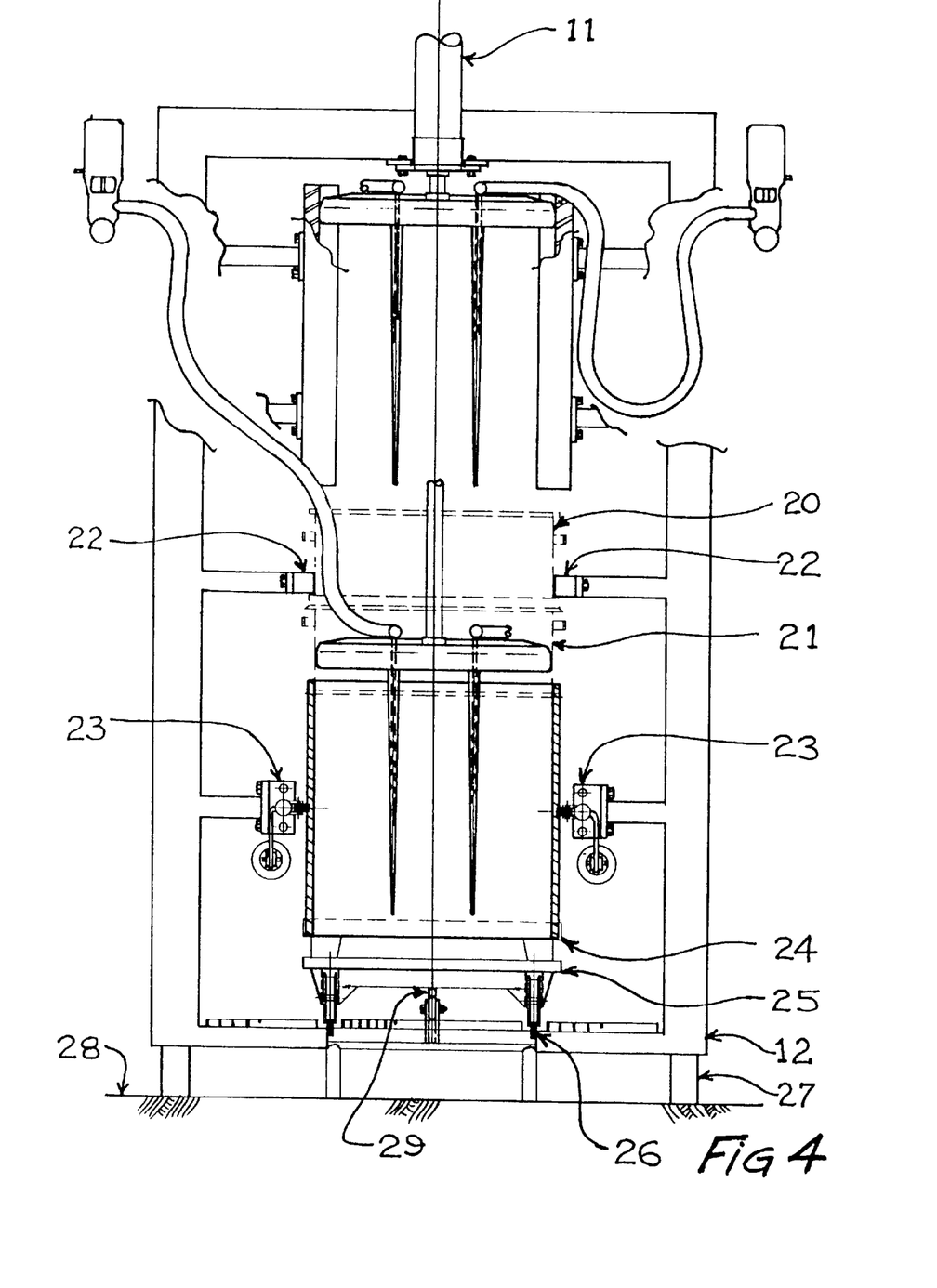
FIG. 4 is an elevational/section view showing generally items comprising the mechanical primary whey removal system, shown in the direction of product container motion.

The primary whey removal system incorporating the primary whey removal elements is best illustrated by the two system elevation views in FIG. 3 and FIG. 4.

All mechanical functions within this system are carried out by pneumatic air cylinder driven mechanisms, each under the control of an electronic control system comprising primarily a programmable controller with an installed program specifically formulated for sequencing control of the illustrated mechanisms, with the necessary devices to detect position and status of each of the mechanical elements, presence of cheese curd containers in the necessary locations, availability of a connected vacuum source for whey extraction, and other features. The control system coordinates activities of the inventors whey removal system with related equipment such as the mechanisms filling each container just prior to its availability for primary removal of whey, and the vacuum source pump with its attendant whey separation and disposal system. The control system also provides for sequencing and timing of the many functions associated with mechanized in place cleaning of the air/whey conveying pipelines which are part of this system, which cleaning process takes place after various disconnections and connections are affected by human operator.

Human involvement is not required directly for this whey removal system to function during a production run, and is restricted during this time to visual supervision to check that no blockage of the individual vacuum whey removal tubes has occurred.

Most components of the system are fabricated using non-corrosive stainless steel, with some parts, particularly those in sliding contact with stainless steel being of approved food grade low friction plastic. Flexible hose assemblies are of food grade material and construction, and are transparent for periodic visual detection of continuing function. Illustrated in FIG. 1. is the structurally stiff perforated pressure and mounting plate 1 to which are permanently attached two stiff cantilevered substantially hollow wedge frames 2 which accommodate, locate positively, and provide support for the removable finely perforated wedge screens 3. One or more vacuum tubes 4, sufficiently narrow, particularly at the lower end, so as to reach substantially toward the extreme lower end of the removable wedge screen 3, each affixed to a more substantial metal tube section 5 are placed during the whey extraction process through precisely located holes penetrating perforated pressure plate 1, for location within the wedge frame 2 and wedge screen 3 assembly.

Tube assemblies 4 and 5, and removable wedge screens 3 are removed for periodic detailed cleaning. Flexible food grade vacuum duty transparent hoses 6 provide connection from the vacuum tube assembly 4 and 5 to vacuum control valve 7 which initiates and terminates the vacuum induced flow of air and whey into whey removal header pipeline 8. Coupling 9 permits a rigid mounting of the entire wedge and vacuum tube assembly to the movable shaft 10 of pneumatic cylinder 11, in turn mounted rigidly to the structurally stiff machine frame 12, abbreviated for purposes of clarity. Rigidly mounted slide rails 13 preferably of a food grade low friction plastic material, very closely control the orientation and path of travel of the entire whey removal assembly comprising primarily perforated pressure plate 1, wedge frames 2, and wedge screens 3, until this assembly has largely entered the confines of the cheese curd container with its attendant upper fill extension collar or collars. Said slide rails are supported structurally by extensions of the machine frame 14. Reciprocating motion of the moving whey removal assembly is denoted by arrow 15.

FIG. 2 depicts essentially the same set of components as FIG. 1, viewed from a direction rotated ninety degrees from that of FIG. 2, to clarify the form and function primarily of perforated pressure plate 1, permanently attached stiff cantilevered substantially hollow wedge frames 2, removable finely perforated wedge screens 3, said screens here shown as finely perforated over all of their surface area with the exception of boundary and mounting areas, to maintain a higher degree of structural integrity in those areas.

Screens are retained during the fluid whey removal process by four or more headed pins 16 permanently affixed to perforated pressure plate 1, which fit within key hole shaped slots in wedge screen 3. Vacuum tubes 4, in this view shown flattened, and therefore splayed, to be rendered sufficiently narrow, at the lower end, so as to reach substantially toward the extreme lower end of the wedge screen 3, are each affixed to a more substantial metal tube section 5 and placed during the whey extraction process within an assembly comprising the wedge frame 2 and wedge screen 3.

FIG. 3 is a plan view of the perforated pressure plate 1 showing in broken line the preferred two hollow wedge frames 2 and wedge screens 3 each accommodating the preferred two vacuum tubes 4, penetrating a dedicated hole in perforated pressure and mounting plate 1, each affixed to a more substantial metal tube section 5 shown retained by a spring clip 18, and providing a connection to transparent flexible hose 6. At the center is shown the preferred pneumatic cylinder 11 and its movable shaft 10 coupled by a cross pin 19 to coupling 9 which transmits the cylinder reciprocating force inducing the pressure plate and wedge and tube assembly, to slide in up and down motion closely confined by rigidly mounted slide rails 13. The cheese curd container 17 shown here as a large rectangular box has its internal faces in close proximity to and aligned with the periphery of pressure plate 1, as is required to provide unimpeded entry and exit of the pressure plate wedge and tube assembly to and from the curd container, and simultaneously provide adequate restriction to the escape of as yet soft cheese curd under pressure from the pressure plate.

FIG. 4 is a composite elevation view showing a pressure plate, wedge, and tube assembly in both its upper position, withdrawn from the cheese container with two attendant fill extension collars 20 and 21, and also in a lower position penetrating largely into the container. Shown also are two location rails 22, of low friction food grade plastic material, acting on the lower flange area of the upper fill extension collar 20 to provide precise lateral location for and hold down of both collars and the container. Shown also are two matching precisely calibrated pneumatic reciprocating feeders 23, providing simultaneous periodic linear propulsion to a succession of cheese curd containers, each of which is held in and supported by a perforated drain pan 24, which in turn is held in and supported by a dolly conveyance 25, the preferred form of which has four flanged wheels running on a structurally stiff and precisely located bar track 26, running through and affixed to structurally stiff machine frame 12, the entire set of equipment being rigidly supported by legs 27 from the process area floor 28. To prevent each assembly comprising one container with at least its dolly, drain pan, and two fill extension collars, from continuing in motion under the inertia imparted by feeders 23, dolly brake 29, a spring loaded plastic block, exerts upward force against the under surface of the dolly, generating a frictional linear retardation. Connections are shown from the frame 12 to bar track 26, dolly brake 29, pneumatic reciprocating feeders 23, location rails 22, and pneumatic cylinder 11.

Figure 5:
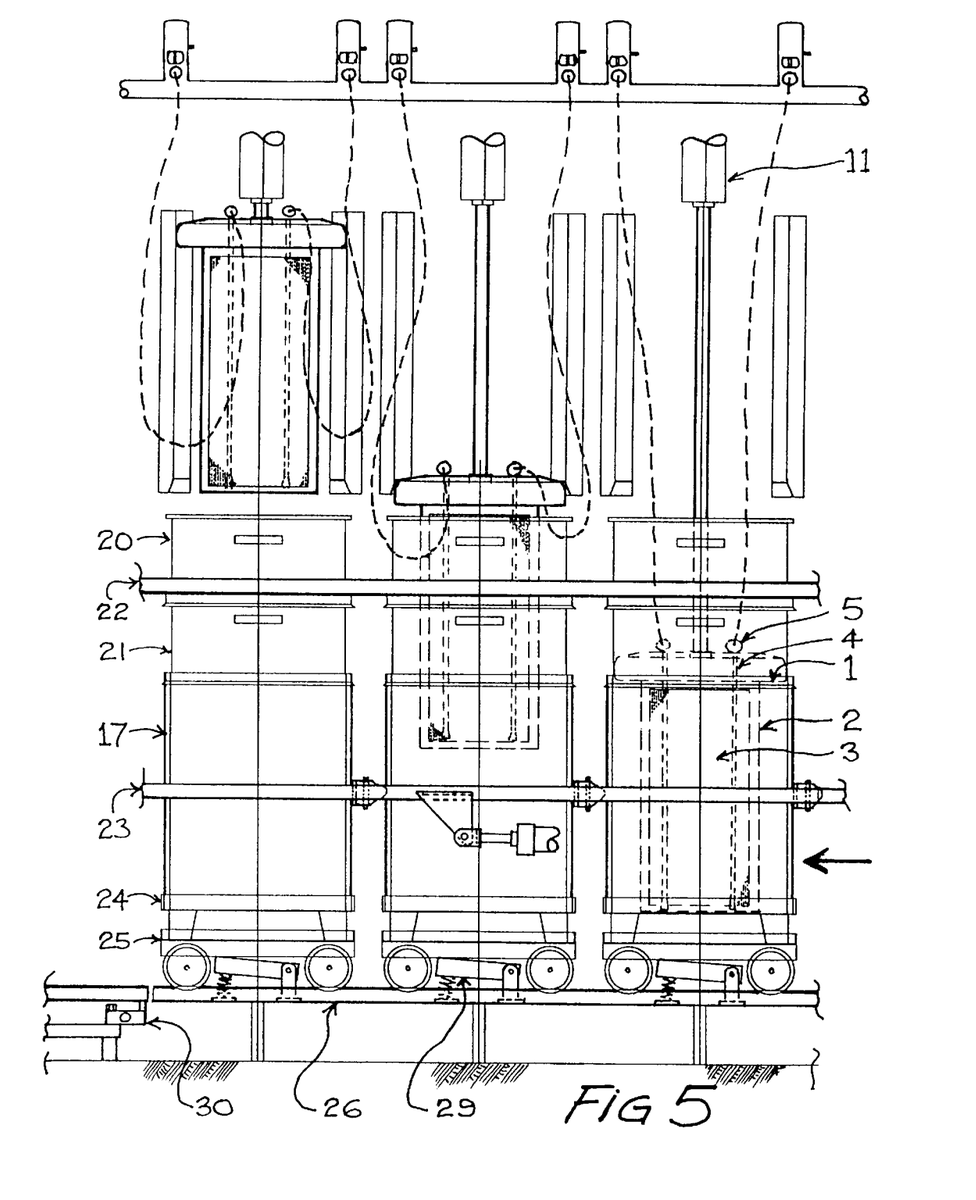
FIG. 5 is a longitudinal elevational/section view from a direction rotated 90 degrees from that of FIG. 4 lateral to the direction of product container motion, showing in typical form a stream of cheese curd containers, each on a conveyance which runs on a supporting track, enabling a linear motion device to sequentially bring each container into a specific position and with fixed orientation directly below each of a series of plate, wedge, and vacuum tube assemblies.

FIG. 5 is a further elevational view showing substantially the mechanical elements of the applicants invention, including particularly a series of cheese curd containers 17 each with a pair of fill extension collars 20 and 21, all supported by a drain pan 24 and carried through the primary fluid whey removal system by a dolly 25 running on bar track 26 and driven by the linear action of feeders 23, at the same time aligned laterally and held down by location rails 22 and retarded for effective and consistent longitudinal position control by dolly brake 29. These described elements under influence of the non-illustrated electronic control system bring each successive cheese curd container directly beneath and closely aligned with successively each of the whey removal assemblies comprising pressure plate 1, hollow wedge frames 2, perforated wedge screens 3, vacuum tube assembly 4 and 5, such that under the influence of pneumatic cylinder 11 each of the whey removal assemblies enters and withdraws from without obstruction each of the cheese curd containers. Upon exiting the primary whey removal system here described, each container passes over the check scale 30, which is programmed to provide a signal upon detecting any container whose weight falls outside a selectable range, thereby directing a human supervisor to check for system whey removal volume malfunction.

The present invention may be embodied in other specific forms without departing from the spirit of the essential attributes thereof; therefore, the illustrated embodiment should be considered in all respects as illustrative and not restrictive, reference being made to the appended claims rather than to the foregoing description to indicate the scope of the invention.

What is claimed:

1. An apparatus for efficiently and controllably removing fluid whey from a curd body in a plurality of containers each having an internal cross section, a width and a depth, the curd body having an upper surface and a lower surface, the apparatus comprising:

(a) a plurality of thin, hollow finely perforated wedges having a maximum width substantially the same as the container width, a length so as to be capable of insertion, in a preferably downward direction, to the full depth of the container and thereby to the lower surface of the curd body, and a gradually tapering cross section; and (b) a plurality of vacuum tubes for differential vacuum pressure removal of liquid whey, said tubes having a cross section less than the minimum cross section of said wedges and said vacuum tubes enclosed within said wedges, said vacuum tubes being adapted to penetrate substantially to the lower surface of the curd body within said wedges.

2. The apparatus of claim 1, further comprising a perforated pressure plate substantially transverse to and engaging said wedges, said pressure plate being adapted to contact said curd body, whereby portions of said curd body are forced through said perforated pressure plate as said perforated pressure plate is forced into said curd body.

3. The apparatus of claim 2, further comprising means for moving said pressure plate, said wedges, and said vacuum tubes cyclically into and out of said curd body.

4. The apparatus of claim 3, wherein said means for moving further comprises a pneumatic cylinder and a timer.

5. The apparatus of claim 4, wherein said means for moving is adapted to vary the pressure exerted by said pressure plate on said curd body.

6. The apparatus of claim 5, wherein said means for moving is programmable.

7. The apparatus of claim 1, further comprising a weighing device adapted to determine the weight of said container and said curd body.

\* \* \* \* \*